(12) United States Patent
Abroshan et al.

(10) Patent No.: US 12,522,294 B2
(45) Date of Patent: Jan. 13, 2026

(54) SYSTEM AND METHOD FOR POSITIONING A TOW VEHICLE AND A TRAILER

(71) Applicant: GM GLOBAL TECHNOLOGY OPERATIONS LLC, Detroit, MI (US)

(72) Inventors: Mehdi Abroshan, Waterloo (CA); Henry W. Grasman, Flushing, MI (US); Mohammadali Shahriari, Markham (CA); Zhi Li, Unionville (CA); Ashraf Abualfellat, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 155 days.

(21) Appl. No.: 18/594,169

(22) Filed: Mar. 4, 2024

(65) Prior Publication Data
US 2025/0276733 A1    Sep. 4, 2025

(51) Int. Cl.
*B62D 13/06* (2006.01)
*B60W 10/20* (2006.01)
*B60W 30/12* (2020.01)
*B60W 30/18* (2012.01)

(52) U.S. Cl.
CPC ............ *B62D 13/06* (2013.01); *B60W 10/20* (2013.01); *B60W 30/12* (2013.01); *B60W 30/18036* (2013.01); *B60W 2300/14* (2013.01); *B60W 2530/205* (2020.02); *B60W 2540/18* (2013.01)

(58) Field of Classification Search
CPC ....... B62D 13/06; B62D 13/00; B60W 10/20; B60W 30/12; B60W 30/18036; B60W 2300/14; B60W 2530/205; B60W 2540/18; B60W 2520/22; B60W 2530/201
USPC ........................................................ 701/41
See application file for complete search history.

(56) References Cited

U.S. PATENT DOCUMENTS

2014/0277942 A1* 9/2014 Kyrtsos .................. G01B 21/02
                                                    702/159

FOREIGN PATENT DOCUMENTS

DE      102019134965 A1      6/2021

* cited by examiner

*Primary Examiner* — Yi-Kai Wang
(74) *Attorney, Agent, or Firm* — Quinn IP Law

(57) ABSTRACT

A method of operating a tow vehicle and a trailer includes identifying at least one of transient state of operating characteristics or steady state operating characteristics. A transient state based estimation is performed if the transient state operating characteristics are identified to determine a transient state based effective trailer wheelbase and a towbar length and a steady state based estimation is performed if the steady state operating characteristics are identified to determine a steady state based effective trailer wheelbase. An estimated effective trailer wheelbase is determined relative to the tow vehicle based on at least one of the transient state based effective trailer wheelbase and the steady state based effective trailer wheelbase. The tow vehicle and the trailer are maneuvered based on the estimated effective trailer wheelbase.

20 Claims, 4 Drawing Sheets

SYSTEM AND METHOD FOR POSITIONING A TOW VEHICLE AND A TRAILER

INTRODUCTION

The present disclosure relates to towing a trailer with a tow vehicle and, more particularly, to determining an effective trailer wheelbase and towbar length for operating the tow vehicle.

A driver of a tow vehicle can encounter several obstacles when towing a trailer. Towing a trailer can influence the dynamics of the tow vehicle and lead the driver of the tow vehicle to operate the vehicle differently due to the increase in length of the tow vehicle and the trailer combined. Additionally, the trailer can articulate relative to the tow vehicle during certain maneuvers, such as during reversing, which requires a change in inputs to the tow vehicle to reverse when compared to reversing without the trailer.

SUMMARY

Disclosed herein is a method of operating a tow vehicle with a trailer. The method includes identifying at least one of transient state of operating characteristics or steady state operating characteristics of the tow vehicle. A transient state based estimation is performed if the transient state operating characteristics are identified to determine a transient state based effective trailer wheelbase and a towbar length and a steady state based estimation is performed if the steady state operating characteristics are identified to determine a steady state based effective trailer wheelbase. An estimated effective trailer wheelbase is determined relative to the tow vehicle based on at least one of the transient state based effective trailer wheelbase and the steady state based effective trailer wheelbase. The tow vehicle and the trailer are maneuvered based on the estimated effective trailer wheelbase.

Another aspect of the disclosure may be where maneuvering the tow vehicle and trailer includes determining a position of the tow vehicle and the trailer relative to a vehicle lane based on sensor data from a plurality of sensors on the tow vehicle. A variation is determined between a current path of the tow vehicle along the vehicle lane and a desired path for the tow vehicle along the vehicle lane. A steering correction is applied to the tow vehicle if the variation exceeds a predetermined threshold.

Another aspect of the disclosure may be where the transient state operating characteristics includes the tow vehicle having a rate of change in steering angle that exceeded a predetermined threshold.

Another aspect of the disclosure may be where calculating the towbar length and the transient state based effective trailer wheelbase includes performing an adaptive filter or a recursive least square derivation.

Another aspect of the disclosure may be where the steady state operating characteristics include the tow vehicle having a rate of change in steering angle below a predetermined threshold.

Another aspect of the disclosure may be where maneuvering the tow vehicle and the trailer includes applying a steering correction to the tow vehicle when positioning the trailer in a parking spot or positioning the trailer along a desired path when reversing the tow vehicle and the trailer.

Another aspect of the disclosure may be where the estimated effective trailer wheelbase is determined based on merging the transient state based effective trailer wheelbase with the steady state based effective trailer wheelbase.

Another aspect of the disclosure may be where the transient state operating characteristics and the steady state operating characteristics are collected when a velocity of the tow vehicle is within a predetermined velocity range.

Another aspect of the disclosure may include performing the steady state based estimation to determine the steady state based effective trailer wheelbase is based on the towbar length determined from the transient state based estimation.

Another aspect of the disclosure may be where the current path is determined based on a set of current vehicle operating parameters and the set of current vehicle operating parameters include a longitudinal velocity of the tow vehicle, a steering angle to the tow vehicle, and a lane position of the tow vehicle.

Another aspect of the disclosure may be where the desired path for the tow vehicle positions the trailer at least a predetermined distance from an edge of a vehicle lane.

Disclosed herein is a non-transitory computer-readable storage medium embodying programmed instructions which, when executed by a processor, are operable for performing a method. The method includes identifying at least one of transient state of operating characteristics or steady state operating characteristics of the tow vehicle. A transient state based estimation is performed if the transient state operating characteristics are identified to determine a transient state based effective trailer wheelbase and a towbar length and a steady state based estimation is performed if the steady state operating characteristics are identified to determine a steady state based effective trailer wheelbase. An estimated effective trailer wheelbase is determined relative to the tow vehicle based on at least one of the transient state based effective trailer wheelbase and the steady state based effective trailer wheelbase. The tow vehicle and the trailer are maneuvered based on the estimated effective trailer wheelbase.

Disclosed herein is a vehicle system. They system includes a vehicle body supported by a first pair of wheels and a second pair of wheels, at least one optical sensor, and a controller in data communication with the at least one optical sensor. The controller is configured to identify at least one of transient state of operating characteristics or steady state operating characteristics of the tow vehicle. The controller is also configured to perform a transient state based estimation if the transient state operating characteristics are identified to determine a transient state based effective trailer wheelbase and a towbar length and perform a steady state based estimation if the steady state operating characteristics are identified to determine a steady state based effective trailer wheelbase. An estimated effective trailer wheelbase is determined by the controller relative to the tow vehicle based on at least one of the transient state based effective trailer wheelbase and the steady state based effective trailer wheelbase. The controller is further configured to maneuver the tow vehicle based on the estimated effective trailer wheelbase.

DETAILED DESCRIPTION

Figure 1:
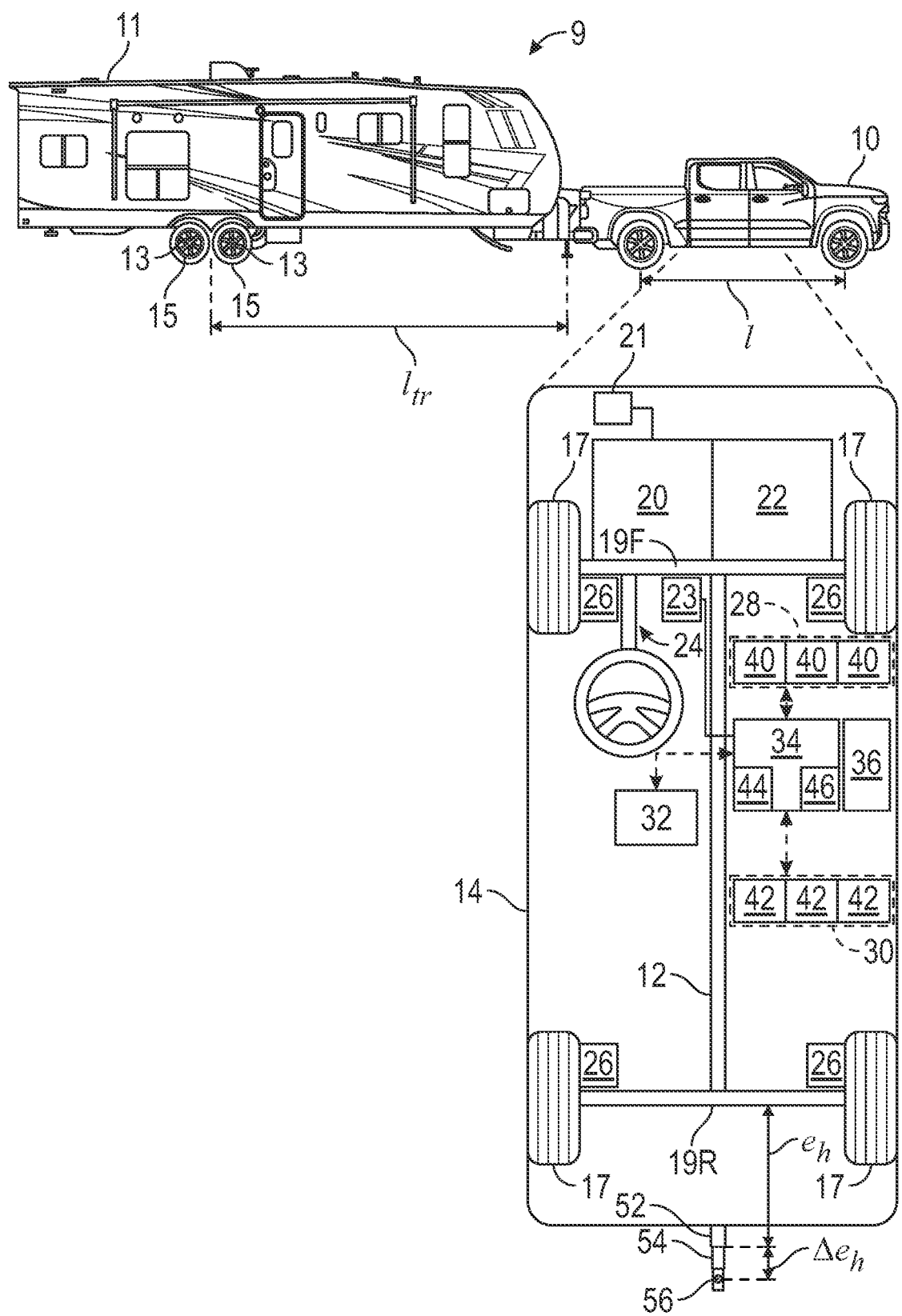
FIG. 1 is a schematic diagram of a vehicle system including a vehicle and a trailer.

The present disclosure is susceptible to embodiments in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly outlined in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof. As used herein, a component that is "configured to" perform a specified function is capable of performing the specified function without alteration, rather than merely having the potential to perform the specified function after further modification. In other words, the described hardware, when expressly configured to perform the specified function, is specifically selected, created, implemented, utilized, programmed, and/or designed for the purpose of performing the specified function.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

With reference to FIG. 1, the vehicle 10 generally includes a chassis 12, a body 14, front and rear wheels 17. The body 14 is arranged on the chassis 12 and substantially encloses components of the vehicle 10. The body 14 and the chassis 12 may jointly form a frame. The wheels 17 are each rotationally coupled to the chassis 12 near a respective corner of the body 14.

In various embodiments, the vehicle 10 may be an autonomous vehicle or a semi-autonomous vehicle. The vehicle 10 is, for example, a vehicle that is automatically controlled to carry passengers from one location to another. The vehicle 10 is depicted in the illustrated embodiment as a pickup truck, but it should be appreciated that other vehicles including sport utility vehicles (SUVs), recreational vehicles (RVs), etc., can also be used.

The vehicle 10 is part of a vehicle system 9. The vehicle system 9 further includes a trailer 11 attached to the vehicle 10. The trailer 11 includes one or more trailer axles 13 each having trailer wheels 15 for supporting the trailer 11.

As shown, the vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an electric machine such as a traction motor and/or a fuel cell propulsion system. The vehicle 10 further includes a battery (or battery pack) 21 electrically connected to the propulsion system 20. Accordingly, the battery pack 21 is configured to store electrical energy and to provide electrical energy to the propulsion system 20. Additionally, the propulsion system 20 may include an internal combustion engine. The transmission system 22 is configured to transmit power from the propulsion system 20 to the vehicle wheels 17 according to selectable speed ratios. According to various embodiments, the transmission system 22 may include a step-ratio automatic transmission, a continuously variable transmission, or other appropriate transmission. The brake system 26 is configured to provide braking torque to the vehicle wheels 17. The brake system 26 may, in various embodiments, include friction brakes, brake by wire, a regenerative braking system such as an electric machine, and/or other appropriate braking systems. The steering system 24 influences a position of the vehicle wheels 17. While depicted as including a steering wheel for illustrative purposes, in some embodiments contemplated within the scope of the present disclosure, the steering system 24 may not include a steering wheel.

The vehicle wheels 17 are supported by a front axle 19F and a rear axle 19R. The front and rear axles 19F and 19R are separated by a distance l. The rear axle 19R is spaced from a receiver 52, such as a hitch attachment, by a distance $e_h$, and a trailer connection 56 on a hitch mount 54 is spaced from the receiver 52 by a distance $\Delta e_h$. For purposes of this disclosure, when the trailer 11 includes more than one axle 13, an effective trailer wheelbase $l_{tr}$ is used to represent how the trailer 11 maneuvers. In particular, the effective trailer wheelbase $l_{tr}$ represents an average distance of the axles 13 from the trailer connection 56 or pivot between the trailer 11 and the tow vehicle 10.

The sensor system 28 includes one or more sensors 40 (i.e., sensing devices) that sense observable conditions of the exterior environment and/or the interior environment of the vehicle 10. The sensors 40 are in communication with the controller 34 and may include, but are not limited to, one or more radars, one or more light detection and ranging (lidar) sensors, one or more ground penetrating radar (GPR) sensors, one or more global positioning systems (GPS) devices, one or more cameras (e.g., optical cameras and/or thermal cameras, such as a rear camera and/or a front camera), brake pedal position sensor, accelerator pedal position sensor, steering angle sensor, speed sensor, wheel speed sensor, ride height sensors, steering angle sensor, ultrasonic sensors, one or more inertial measurement units (IMUs), and/or other sensors.

The sensor system 28 includes one or more Global Positioning System (GPS) transceiver configured to detect and monitor the route data (i.e., route information). The GPS device is configured to communicate with a GPS to locate the position of the vehicle 10 in the globe. The GPS device is in electronic communication with the controller 34. Because the sensor system 28 provides data to the controller 34, the sensor system 28 and its sensors 40 are considered sources of information (or simply sources).

The actuator system 30 includes one or more actuator devices 42 that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered). For example, the actuator devices 42 include an accelerator pedal, a brake pedal, etc.

The controller 34 includes at least one processor 44 and a non-transitory computer-readable storage device or media 46. The processor 44 can be custom-made or commercially available, a central processing unit (CPU), a graphics processing unit (GPU), an auxiliary processor among several processors associated with the controller 34, a semiconductor-based microprocessor (in the form of a microchip or chip set), a microprocessor, a combination thereof, or generally a device for executing instructions. The computer-readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using several other memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although a single controller 34 is shown in FIG. 1, embodiments of the vehicle 10 may include a number of controllers 34 that communicate over a suitable communication medium or a combination of communication mediums and that cooperate to process the sensor signals, perform logic, calculations, methods, and/or algorithms, and generate control signals to automatically control features of the vehicle 10.

The vehicle 10 includes a human-machine interface (HMI) 23, which may be a center stack screen or a drive information center. The HMI 23 interacts with a user to show information and receives confirmation, activation, cancellation commands, etc. The HMI 23 may be configured as an alarm, such as a speaker to provide a sound, a haptic feedback in a vehicle seat or other object, a visual display, or other device suitable to provide a notification to the vehicle operator of the vehicle 10. The HMI 23 is in electronic communication with the controller 34 and is configured to receive inputs from a user (e.g., vehicle operator). Accordingly, the controller 34 is configured to receive inputs from the user via the HMI 23. The HMI 23 includes a display configured to display information to the user (e.g., vehicle operator or passenger) and may include one or more speakers to provide an auditable notification to the vehicle operator.

Figure 2:
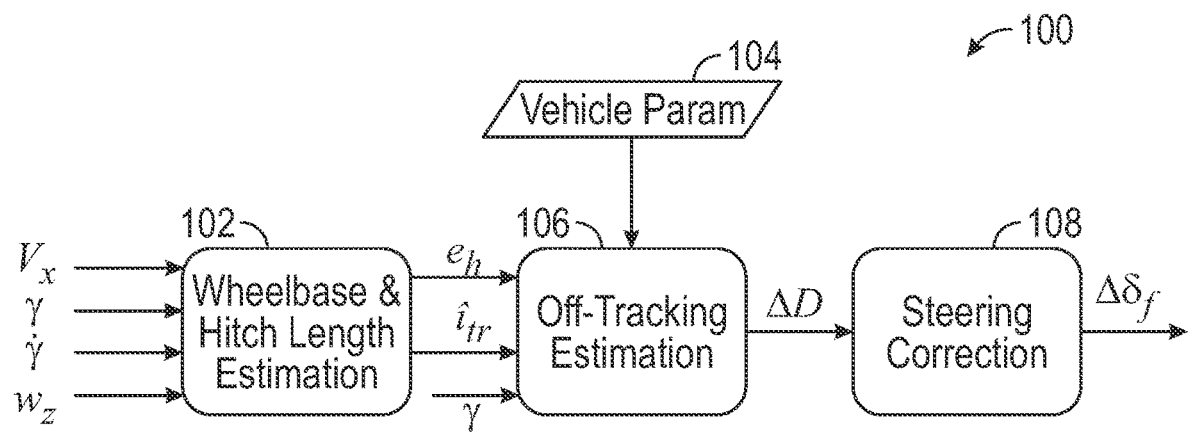
FIG. 2 illustrates a flowchart of an example method of positioning a tow vehicle and a trailer within a vehicle lane.
Figure 6:
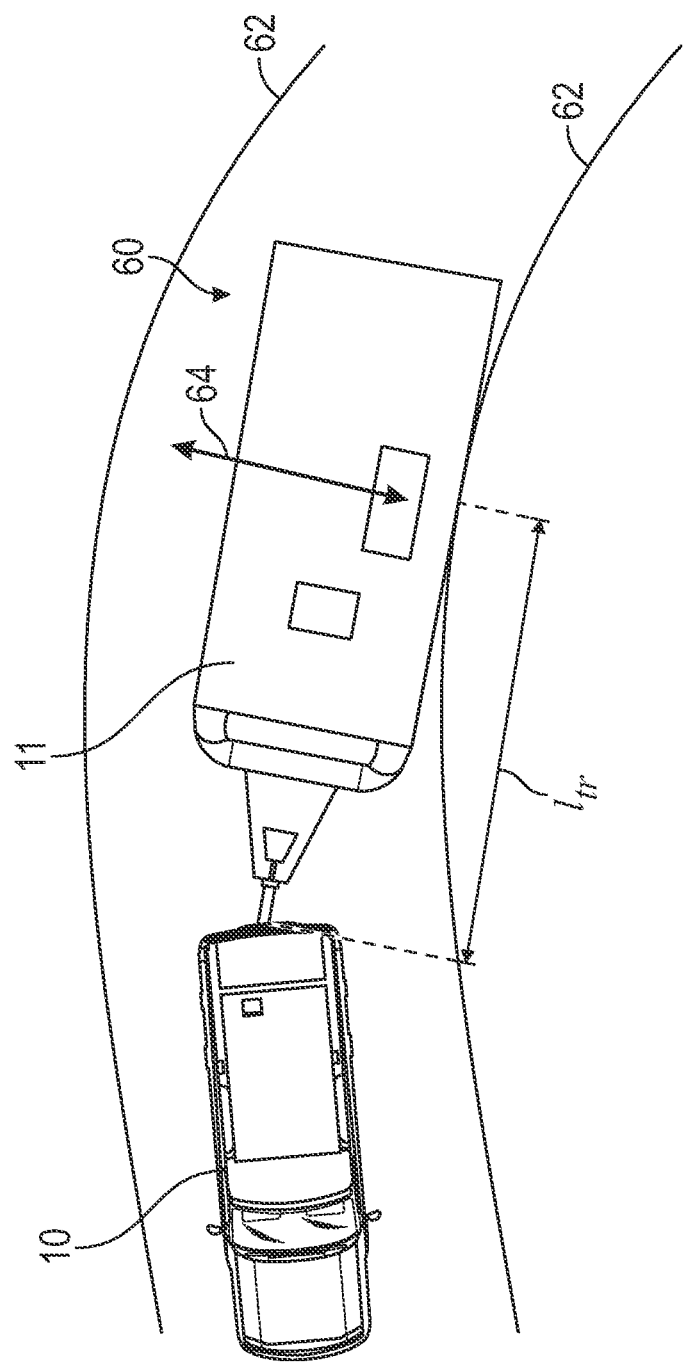
FIG. 6 schematically illustrates positioning the tow vehicle and the trailer FIG. 1 within a vehicle lane.

FIG. 2 illustrates a flow diagram of a method 100 of positioning the tow vehicle 10 and the trailer 11 within a vehicle lane 60 as shown in FIG. 6. When the tow vehicle 10 is pulling the trailer 11 along the vehicle lane 60, the trailer 11 travels closer to an edge 62 of the vehicle lane 60 than the tow vehicle 10. To compensate for the proximity of the trailer 11 to the edge 62 of the vehicle lane 60, the tow vehicle 10 may need to make wider turns than if the tow vehicle 10 did not have the trailer 11. Two parameters that contribute to determining a trajectory or path that the trailer 11 follows in the vehicle lane 60 include a distance from the trailer connection 56 to a known location on the tow vehicle 10, such as the rear axle 19R, and the other parameter includes the effective trailer wheelbase ($l_{tr}$). This disclosure will allow these two parameters to be calculated from operation of the tow vehicle 10 and trailer 11 without additional input from the driver of the tow vehicle 10.

In the illustrated example, the tow vehicle 10 includes a receiver-style hitch having a receiver 52 that accepts a hitch mount 54 within the receiver 52. However, other types of trailer connections can benefit from this disclosure, such as fifth-wheel or goose-neck connections. The hitch mount 54 is generally fixed to the receiver 52 with a pin that extends through both the hitch mount 54 and the receiver 52. The hitch mount 54 also includes the trailer connection 56 adjacent a distal end for connecting to the trailer 11 and allowing the trailer 11 to pivot relative to the tow vehicle 10.

Figure 4:
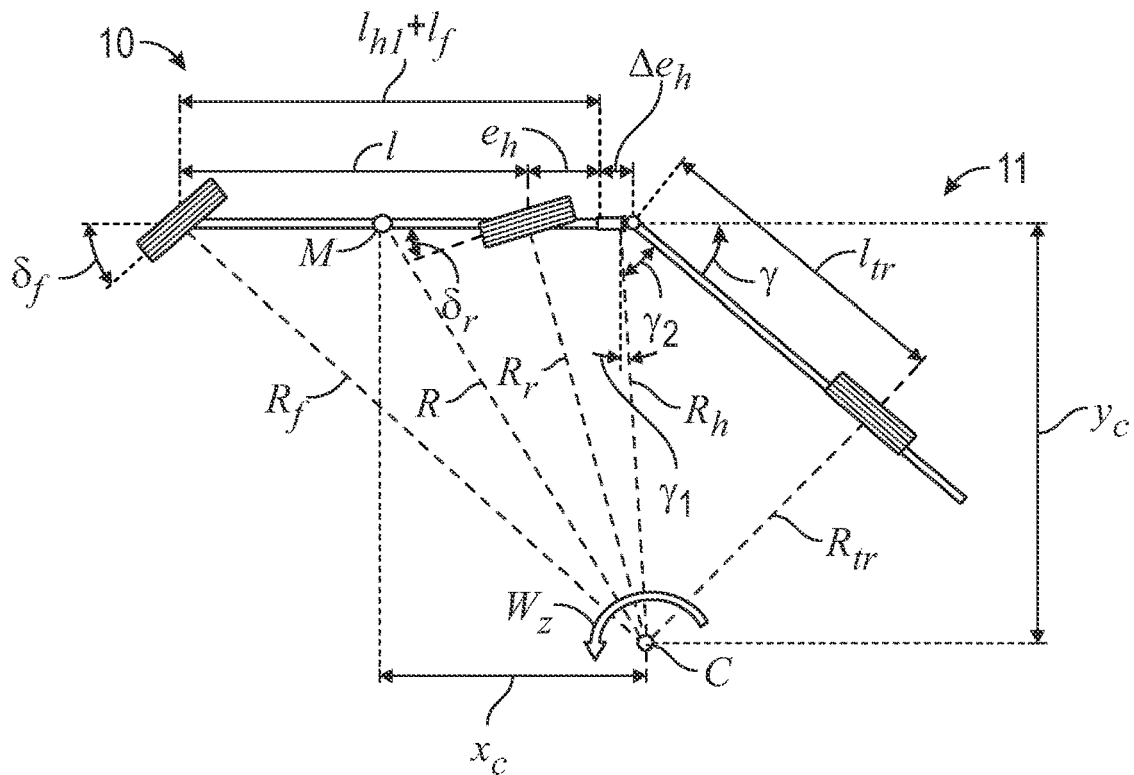
FIG. 4 schematically illustrates the tow vehicle and the trailer of FIG. 1 configured for determining a transient-based effective trailer wheelbase.

Because the receiver 52 is in a fixed position relative to the tow vehicle 10, its location relative to the vehicle 10 remains unchanged during use. However, the location of the trailer connection 56 relative to the receiver can vary depending on a length of the hitch mount 54 attached to the receiver 52. As shown in FIGS. 1 and 4, the receiver 52 or hitch is located a distance en from a rear axle 19R on the tow vehicle 10. The variable distance between the receiver 52 and the trailer connection 56 is captured by the distance $\Delta e_h$. The distance $\Delta e_h$ can be measured by the driver of the tow vehicle 10 but performing this additional step can be time-consuming and require tools that may not be available to the driver of the tow vehicle 10 when connecting to the trailer 11. One feature of this disclosure is to reduce the number of steps required by the driver of the tow vehicle 10 to take when changing between hitch mounts 54 and trailer 11.

Figure 3:
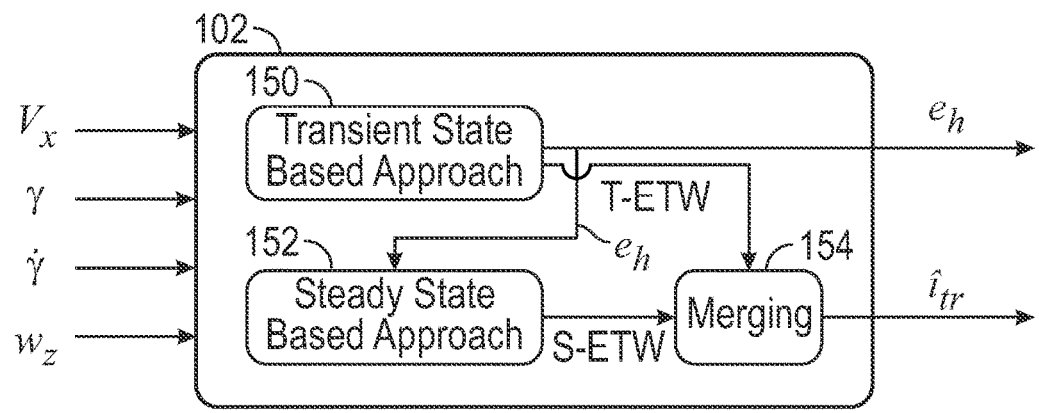
FIG. 3 illustrates a flowchart of an example method of determining a towbar length and an effective trailer wheelbase.

The method 100 begins at Block 102 by receiving vehicle operating characteristics that are obtained while the tow vehicle 10 is in motion. In one example, the vehicle operating characteristics can include a longitudinal velocity ($V_x$) of the tow vehicle 10, a hitch angle ($\gamma$) formed between the tow vehicle 10 and the trailer 11, a hitch angle change rate ($\dot{\gamma}$), and a vehicle yaw rate ($w_z$). These operating characteristics are used to estimate the effective trailer wheelbase and a towbar length ($\Delta e_h$) relative to the receiver 52 such that the location of the trailer connection relative to tow vehicle 10 can be determined. The method 100 estimates the effective trailer wheelbase $\hat{l}_{tr}$ by merging (Block 154) a calculation of a transient state effective trailer wheelbase (Block 150) and a calculation of a steady-state effective trailer wheelbase (Block 152) as shown in the expanded view of Block 102 in FIG. 3. The transient state effective trailer wheelbase is calculated from transient state operating characteristics and the steady state effective trailer wheelbase is calculated from steady-state operating characteristics as will be discussed in greater detail below.

In one example, the transient state effective trailer wheelbase $l_{tr}$ from Block 150 (see FIGS. 2-3) can be calculated based on EQ. 1 below.

$$l_{tr} = -\frac{(v_x \sin(\gamma) + w_z \cos(\gamma))(e_h + \Delta e_h)}{w_z + \dot{\gamma}} \quad \text{EQ. 1}$$

Because a lateral slip angle of the rear tire on the tow vehicle 10 and the trailer tires is assumed to be small, the following assumptions can be made in EQS. 2-4 to simply EQ. 1.

$$v_y^h + v_y^{veh} \cos(\gamma) + v_x \sin(\gamma) = 0 \quad \text{EQ. 2}$$

$$v_y^h = l_{tr} \times \dot{\gamma} \quad \text{EQ. 3}$$

$$v_y^{veh} = (l_{tr}\cos(\gamma) + e_h) \times w_z \quad \text{EQ. 4}$$

In EQ. 2 above, $v_y^h$ is a lateral velocity (in the trailer coordinate system) from the hitch angle rate and the relative velocity of the trailer 11 with respect to the vehicle 10. $v_y^{veh}$ is a lateral velocity (in the vehicle coordinate system) at the trailer axle 13 assuming hitch angle rate is zero signifying that the trailer 11 and tow vehicle 10 are operating as a unified mass. $v_x$ is a longitudinal velocity (in the vehicle coordinate system).

Figure 5:
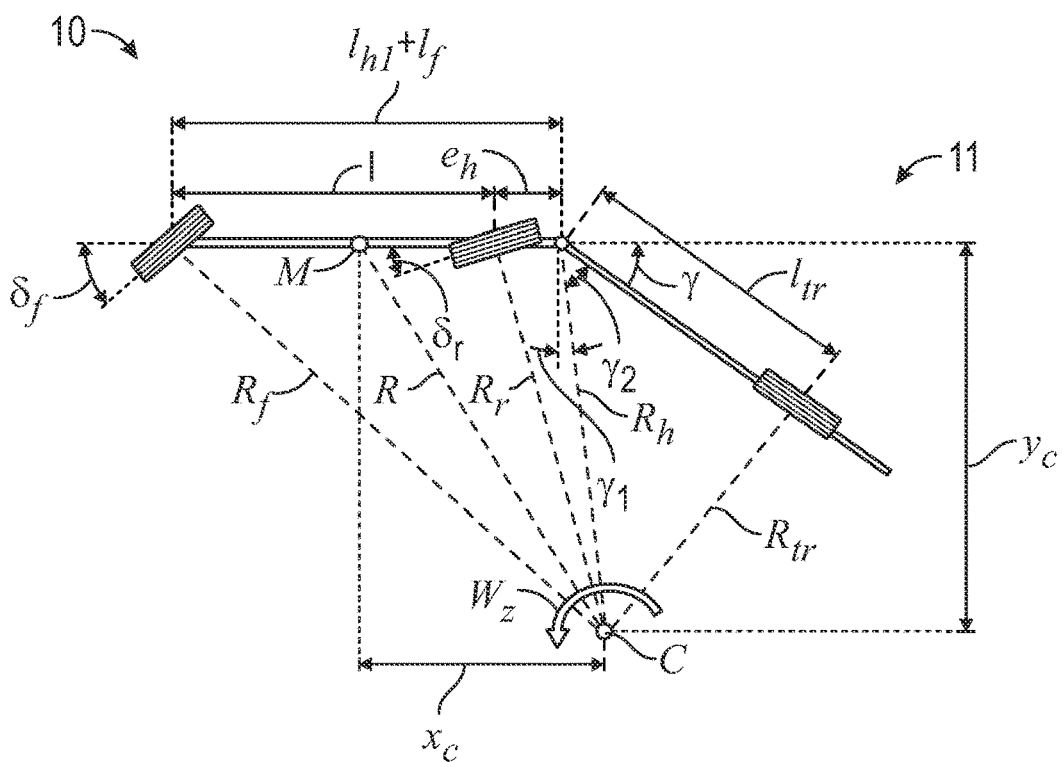
FIG. 5 schematically illustrates the tow vehicle and the trailer of FIG. 1 configured for calculating a steady state based effective trailer wheelbase.

Utilizing EQS. 2-4, EQ. 1 can be simplified as shown in FIG. 5 below.

$$l_{tr} = -\frac{e_h w_z \cos(\gamma) + v_x \sin(\gamma)}{\dot{\gamma} + w_z} \quad \text{EQ. 5}$$

This allows EQ. 5 to be rearranged as shown in EQ. 6 below to solve for $l_{tr}$ and $\Delta e_h$.

$$-(v_x \sin(\gamma) + w_z \cos(\gamma)(e_h)) = [(w_z + \dot{\gamma}) \quad w_z \cos(\gamma)]\begin{bmatrix} l_{tr} \\ \Delta e_h \end{bmatrix} \quad \text{EQ. 6}$$

Using a recursive least square derivation (RLS), an estimator is developed to estimate $l_{tr}$ and $\Delta e_h$ simultaneously where $-(v_x \sin(\gamma) + w_z \cos(\gamma)(e_h))$ is used as a measurement in the RLS and $[(w_z + \dot{\gamma}) \; w_z \cos(\gamma)]$ is used as a regressor vector in the RLS. The RLS can then be solved to determine the transient state effective trailer wheelbase $l_{tr}$ and the towbar length $\Delta e_h$. Alternatively, an adaptive filter can be used to estimate $l_{tr}$ and $\Delta e_h$.

To calculate the steady state effective trailer wheelbase at Block 152, the method 100 must identify steady state operating characteristics for the tow vehicle 10 and the trailer 11. In one example, the steady state operating characteristics are obtained while the vehicle 10 is performing a turn of a constant radius at a low speed. However, these operating characteristics can also be obtained when the tow vehicle 10 is moving at a variable speed while still performing the turn with the constant radius of curvature that results in the formation of a hitch angle $\gamma$. In one example, the hitch angle $\gamma$ is above a predetermined threshold value.

Furthermore, the steady state operating characteristics can be obtained over a variable length of time if a steady state equilibrium is reached regarding the hitch angle $\gamma$ as determined by a value of $\dot{\gamma}$ being less than a predetermined threshold value. In one example, the low speed is less than 18.6 miles per hour (30 kilometers per hour) and greater than 3 miles per hour (4.8 kilometers per hour) and the constant turn includes a variation in input steering angle for the vehicle 10 that is less than a predetermined rate of change for the steering angle. However, the steady state operating characteristics can also be obtained during higher speed maneuvers that do not result in nonlinear vehicle dynamics above a predetermined threshold.

At Block 152, EQS. 7-9 are used to determine the steady state effective trailer wheelbase $l_{tr}$. In EQ. 7 below, the value for en is obtained from Block 150 and includes the towbar length $\Delta e_h$ added to the distance between the hitch receiver 52 and the rear axle 19R shown in FIG. 4. In EQ. 7 below, the distances are taken with respect to a vehicle-based coordinate system relative to a center of mass M of the vehicle 10. In the illustrated example, $x_c$ defines a longitudinal distance from a center of mass M of the vehicle 10 to a center C of the turning radius R of the vehicle 10, $y_c$ defines a lateral distance between the center of mass M to the center of the turning radius R, and $l_r$ defines a wheelbase of the vehicle 10. These values allow for the calculation of the angel $\gamma_1$. The angle $\gamma_1$ is defined between a line extending perpendicular to a central longitudinal axis of the vehicle 10 and a line defining a radius of curvature $R_h$ of the trailer connection 56.

$$\gamma_1 = \tan^{-1}\left(\frac{x_c - (l_r + e_h)}{y_c}\right) \quad \text{EQ. 7}$$

With the calculation for angle $\gamma_1$ obtained as described above, the method 100 then proceeds to calculate the angle $\gamma_2$. The angle $\gamma_2$ is obtained by subtracting a sum of the angles $\gamma_1$ and $\gamma$ from $\pi/2$ or 90 degrees as shown by EQ. 8 below.

$$\gamma_2 = \frac{\pi}{2} - (\gamma + \gamma_1) \quad \text{EQ. 8}$$

With the angle $\gamma_2$ from EQ. 8 above, the method 100 can then calculate a length for the radius of a curvature $R_h$ for the trailer connection 56 with EQ. 9 as shown below.

$$R_h = \sqrt{y_c^2 + (x_c - (l_r + e_h))^2} \quad \text{EQ. 9}$$

With the length of the radius of curvature of the hitch $R_h$, the method 100 calculates the steady state effective trailer wheelbase with EQ. 10 shown below.

$$l_{tr} = R_h \cos(\gamma_2) \qquad \text{EQ. 10}$$

The method 100 then proceeds to Block 154 to merge the transient state effective trailer wheelbase with the steady state effective trailer wheelbase to generate an estimated effective trailer wheelbase $\hat{l}_{tr}$. In one example, the method 100 may merge the two effective trailer wheelbases to generate the estimated effective trailer wheelbase $\hat{l}_{tr}$ by taking an average of the two. The estimated effective trailer wheelbase $\hat{l}_{tr}$ can also be used to prevent trailer sway through the controller 34 signaling to the trailer 11 to apply trailer brakes based on the estimated effective trailer wheelbase $\hat{l}_{tr}$.

With the merged trailer wheelbase, the method 100 proceeds to Block 106. At Block 106, the method 100 utilizes the estimated effective trailer wheelbase $\hat{l}_{tr}$ and the hitch angle γ in addition to other vehicle parameters from Block 104, such as the wheelbase/of the tow vehicle 10, to determine a position of the vehicle system 9 on a roadway, such as the vehicle lane 60. By determining the position of the vehicle system 9 in the vehicle lane 60, the method 100 can compare a predicted or actual path of the vehicle system 9 with a desired path for the vehicle system 9. The comparison will yield a difference ΔD that represents a variation between the predicted path and the desired path. In one example, the difference ΔD can be represented as a lateral distance 64 between the predicted path and the desired path. The difference ΔD is then provided to Block 108.

At Block 108, the method 100 determines if the difference ΔD would require the method 100 to apply a steering correction $\Delta\delta_f$ to the tow vehicle 10 to move the vehicle system 9 closer to the desired path. The steering correction $\Delta\delta_f$ can be applied to the tow vehicle 10 through the controller 34 in connection with the actuator system 30 and the steering system 24. If the difference ΔD is greater than a predetermined threshold, then the method 100 outputs the steering correction $\Delta\delta_f$. In one example, the steering correction $\Delta\delta_f$ is sent to the actuator system 30 to apply a change to the current path or trajectory of the tow vehicle 10 through the steering system 24. The application of the steering correction $\Delta\delta_f$ will ensure that the tow vehicle 10 and trailer 11 remain within the vehicle lane 60. The method 100 can also provide an alert if the trailer 11 cannot remain within the vehicle lane 60 by applying the steering correction $\Delta\delta_f$. The method 100 can also be applied to positioning the trailer 10 in a parking space or when operating the tow vehicle 10 and trailer 11 in reverse. The steering correction $\Delta\delta_f$ can also be applied when performing other maneuvers, such as during parking or reversing.

The terms "a" and "an" do not denote a limitation of quantity, but rather denote the presence of at least one of the referenced items. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in a suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, test standards are the most recent standard in effect as of the filing date of this application, or, if priority is claimed, the filing date of the earliest priority application in which the test standard appears.

Unless defined otherwise, technical, and scientific terms used herein have the same meaning as is commonly understood by one of skill in the art to which this disclosure belongs.

While the above disclosure has been described with reference to exemplary embodiments, it will be understood by those skilled in the art that various changes may be made, and equivalents may be substituted for elements thereof without departing from its scope. In addition, many modifications may be made to adapt a particular situation or material to the teachings of the disclosure without departing from the scope thereof. Therefore, it is intended that the present disclosure not be limited to the particular embodiments disclosed but will include embodiments falling within the scope thereof.

What is claimed is:

1. A method of operating a tow vehicle with a trailer, the method comprising:
   identifying at least one of transient state operating characteristics or steady state operating characteristics;
   performing a transient state based estimation if the transient state operating characteristics are identified to determine a transient state based effective trailer wheelbase and a towbar length;
   performing a steady state based estimation if the steady state operating characteristics are identified to determine a steady state based effective trailer wheelbase;
   determining an estimated effective trailer wheelbase relative to the tow vehicle based on at least one of the transient state based effective trailer wheelbase and the steady state based effective trailer wheelbase; and
   maneuvering the tow vehicle and the trailer based on the estimated effective trailer wheelbase.

2. The method of claim 1, wherein maneuvering the tow vehicle and the trailer includes:
   determining a position of the tow vehicle and the trailer relative to a vehicle lane based on sensor data from a plurality of sensors on the tow vehicle;
   determining a variation between a current path of the tow vehicle along the vehicle lane and a desired path for the tow vehicle along the vehicle lane; and
   applying a steering correction to the tow vehicle if the variation exceeds a predetermined threshold.

3. The method of claim 1, wherein the transient state operating characteristics include the tow vehicle having a rate of change in steering angle that exceeded a predetermined threshold.

4. The method of claim 3, wherein calculating the towbar length and the transient state based effective trailer wheelbase includes performing an adaptive filter or a recursive least square derivation.

5. The method of claim 1, wherein the steady state operating characteristics include the tow vehicle having a rate of change in steering angle below a predetermined threshold.

6. The method of claim 5, wherein maneuvering the tow vehicle and the trailer includes applying a steering correction to the tow vehicle when positioning the trailer in a parking spot or positioning the trailer along a desired path when reversing the tow vehicle and the trailer.

7. The method of claim 1, wherein the estimated effective trailer wheelbase is determined based on merging the transient state based effective trailer wheelbase with the steady state based effective trailer wheelbase.

8. The method of claim 7, wherein the transient state operating characteristics and the steady state operating characteristics are collected when a velocity of the tow vehicle is within a predetermined velocity range.

9. The method of claim 7, wherein performing the steady state based estimation to determine the steady state based effective trailer wheelbase is based on the towbar length determined from the transient state based estimation.

10. The method of claim 2, wherein the current path is determined based on a set of current vehicle operating parameters and the set of current vehicle operating parameters include a longitudinal velocity of the tow vehicle, a steering angle to the tow vehicle, and a lane position of the tow vehicle.

11. The method of claim 10, wherein the desired path for the tow vehicle positions the trailer at least a predetermined distance from an edge of a vehicle lane.

12. A non-transitory computer-readable storage medium embodying programmed instructions which, when executed by a processor, are operable for performing a method comprising:
identifying at least one of transient state operating characteristics or steady state operating characteristics of a tow vehicle;
performing a transient state based estimation if the transient state operating characteristics are identified to determine a transient state based effective trailer wheelbase and a towbar length;
performing a steady state based estimation if the steady state operating characteristics are identified to determine a steady state based effective trailer wheelbase;
determining an estimated effective trailer wheelbase relative to the tow vehicle based on at least one of the transient state based effective trailer wheelbase and the steady state based effective trailer wheelbase; and
maneuvering the tow vehicle and the trailer based on the estimated effective trailer wheelbase.

13. The computer-readable storage medium of claim 12, wherein the transient state operating characteristics include the tow vehicle having a rate of change in steering angle that exceeded a predetermined threshold.

14. The computer-readable storage medium of claim 13, wherein maneuvering the tow vehicle and the trailer includes:
determining a position of the tow vehicle and the trailer relative to a vehicle lane based on sensor data from a plurality of sensors on the tow vehicle;
determining a variation between a current path of the tow vehicle along the vehicle lane and a desired path for the tow vehicle along the vehicle lane; and
applying a steering correction to the tow vehicle if the variation exceeds a predetermined threshold.

15. The computer-readable storage medium of claim 14, wherein calculating the towbar length and the transient state based effective trailer wheelbase includes performing an adaptive filter or a recursive least square derivation.

16. The computer-readable storage medium of claim 13, wherein the steady state operating characteristics including the tow vehicle having a rate of change in steering angle below a predetermined threshold.

17. The computer-readable storage medium of claim 16, wherein maneuvering the tow vehicle and the trailer includes applying a steering correction to the tow vehicle when positioning the trailer in a parking spot or positioning the trailer along a desired path when reversing the tow vehicle and the trailer.

18. A vehicle system comprising:
a vehicle body supported by a first pair of wheels and a second pair of wheels;
at least one optical sensor and a controller in data communication with the at least one optical sensor, wherein the controller is configured to:
identify at least one of transient state operating characteristics or steady state operating characteristics of a tow vehicle;
perform a transient state based estimation if the transient state operating characteristics are identified to determine a transient state based effective trailer wheelbase and a towbar length;
perform a steady state based estimation if the steady state operating characteristics are identified to determine a steady state based effective trailer wheelbase;
determine an estimated effective trailer wheelbase relative to the tow vehicle based on at least one of the transient state based effective trailer wheelbase and the steady state based effective trailer wheelbase; and
maneuver the tow vehicle and the trailer based on the estimated effective trailer wheelbase.

19. The vehicle system of claim 18, wherein to maneuver the tow vehicle and the trailer, the controller is configured to:
determine a position of the tow vehicle and a trailer relative to a vehicle lane based on sensor data from a plurality of sensors on the tow vehicle;
determine a variation between a current path of the tow vehicle along the vehicle lane and a desired path for the tow vehicle along the vehicle lane; and
apply a steering correction to the tow vehicle if the variation exceeds a predetermined threshold.

20. The vehicle system of claim 19, wherein the transient state operating characteristics including the tow vehicle having a rate of change in steering angle that exceeded a predetermined threshold and the steady state operating characteristics including the tow vehicle having a rate of change in steering angle below a predetermined threshold.

* * * * *